United States Patent [19]

Konno et al.

[11] Patent Number: 5,204,408
[45] Date of Patent: Apr. 20, 1993

[54] MODIFIED SILICONE VULCANIZATION ACTIVATOR

[75] Inventors: Hiroki Konno, Annaka; Yasushi Yamamoto, Takasaki; Motoo Fukushima, Kawasaki; Hironao Fujiki, Takasaki, all of Japan

[73] Assignee: Shin-Etsu Chemical Co., Ltd., Tokyo, Japan

[21] Appl. No.: 782,640

[22] Filed: Oct. 25, 1991

Related U.S. Application Data

[63] Continuation of Ser. No. 497,680, Mar. 23, 1990, abandoned.

Foreign Application Priority Data

Mar. 28, 1989 [JP] Japan .................................. 1-77719

[51] Int. Cl.$^5$ ................................................ C08F 8/00
[52] U.S. Cl. .................................... 525/105; 525/276; 525/281; 525/288; 525/477; 525/479; 528/24
[58] Field of Search ............... 525/104, 276, 281, 288, 525/477, 479; 528/24

[56] References Cited

U.S. PATENT DOCUMENTS

| | | | |
|---|---|---|---|
| 2,679,496 | 5/1954 | Bunnell | 528/39 |
| 3,892,643 | 7/1975 | Tanaka et al. | 522/167 |
| 3,896,123 | 7/1975 | De Zuba et al. | 528/28 |
| 4,980,396 | 12/1990 | Yoshida | 528/41 |

FOREIGN PATENT DOCUMENTS 61-44107 1/1986 Japan .
62-5463 5/1987 Japan .

*Primary Examiner*—Melvyn I. Marquis
*Attorney, Agent, or Firm*—Birch, Stewart, Kolasch & Birch

[57] ABSTRACT

A modified organopolysiloxane comprising [$R^1_2SiO_{2/2}$] or [$R^1_3SiO_{1/2}$] units wherein $R^1$ is a hydrogen atom or a monovalent hydrocarbon group having 1 to 12 carbon atoms, at least two $R^1$ substituents per molecule being replaced by specific isocyanurate or cyanurate groups is a vulcanization activator for assisting in vulcanization of fluorocarbon rubber or fluorocarbon/silicon rubber compositions with peroxide vulcanizing agents. It is prepared by reacting triallyl isocyanurate, triallyl cyanurate or a derivative thereof with dimethylchlorosilane or methyldichlorosilane in the presence of a platinum catalyst to form a chlorosilane containing diallylisocyanurate or diallylcyanurate groups, followed by hydrolysis. An alternative process is by reacting triallyl isocyanurate, triallyl cyanurate or a derivative thereof with a siloxane in the presence of a platinum catalyst.

8 Claims, 5 Drawing Sheets

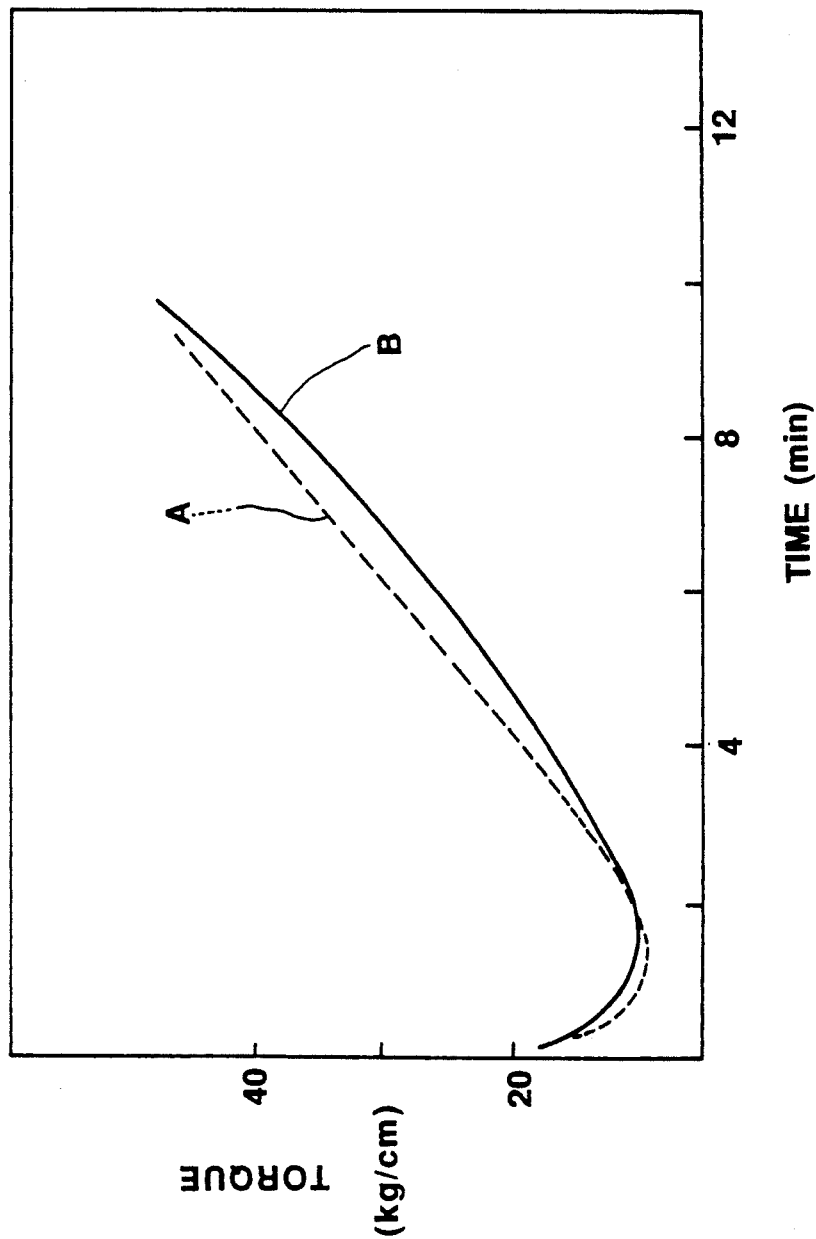

MODIFIED SILICONE VULCANIZATION ACTIVATOR

This application is a continuation of copending application Ser. No. 07/497,680, filed on Mar. 23, 1990, now abandoned. The entire contents of which are hereby incorporated by reference.

This invention relates to modified silicone vulcanization activators for assisting in vulcanization of peroxide vulcanizable fluorocarbon and silicone rubbers and a process for making the same.

BACKGROUND OF THE INVENTION

In the prior art, fluorocarbon rubber was generally vulcanized by three types of vulcanization methods i.e., amine, polyol, and peroxide vulcanization methods. See Honda and Kawauchi, Kogyo Zairyou (Industrial Material), 31 5, page 35 and Goda and Sugimoto, Journal of the Japan Rubber Society, 51, 4, page 209.

As to the vulcanization of silicone rubber, typical vulcanization methods include peroxide vulcanization, condensation vulcanization, and addition vulcanization utilizing hydrosilylation. See Rubber Chemistry and Technology, 52. page 437.

Attempts were recently made to impart low-temperature properties characteristic of silicone rubber to fluorocarbon rubber. To this end, it was proposed to concurrently vulcanize fluorocarbon rubber and silicone rubber using a peroxide vulcanizing agent which is common to both fluorocarbon rubber and silicone rubber. See Kunio Goto, Kogyo Zairyou (Industrial Material), 19. 10, page 34, and Japanese Patent Publication Nos. 5463/1987 and 44107/1986.

However, the prior art peroxide vulcanization had several drawbacks. In the peroxide vulcanization of fluorocarbon rubber, a vulcanization activator such as triallyl isocyanurate and triallyl cyanurate was generally used along with the peroxide vulcanizing agent. When vulcanization was effected by the hot air vulcanization (HAV) method, a vigorous foaming phenomenon occurred, resulting in a spongy rubber product which was commercially unacceptable in view of mechanical strength, dimensional accuracy, and appearance. Since it was difficult to form vulcanized rubber articles of quality and processability by the HAV method, the peroxide vulcanization of fluorocarbon rubber largely depended on high pressure steam vulcanization and hot mold vulcanization methods irrespective of their cost.

Similar problems arose in vulcanizing rubber compositions comprising fluorocarbon rubber and silicon rubber components with peroxides.

SUMMARY OF THE INVENTION

Therefore, an object of the present invention is to provide a vulcanization activator which can satisfactorily assist in the vulcanization of fluorocarbon rubber compositions and rubber compositions comprising fluorocarbon rubber and silicon rubber components with peroxide vulcanizing agents and thus permits the use of the HAV method.

According to the present invention, there is provided a modified silicone vulcanization activator in the form of an organopolysiloxane comprising units selected from $[R^1{}_2SiO_{2/2}]$ units and $[R^1{}_3SiO_{1/2}]$ units wherein $R^1$ is selected from the class consisting of a hydrogen atom and a substituted or unsubstituted monovalent hydrocarbon group having 1 to 12 carbon atoms, at least two $R^1$ substituents per molecule being replaced by isocyanurate or cyanurate groups selected from the class consisting of nitrogenous organic groups represented by formulae (1) to (6):

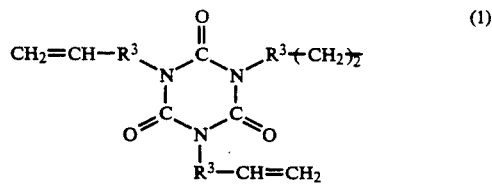

(1)

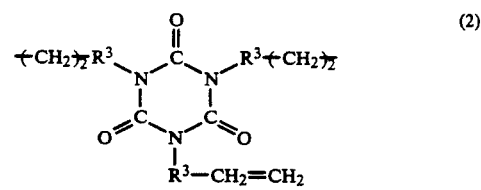

(2)

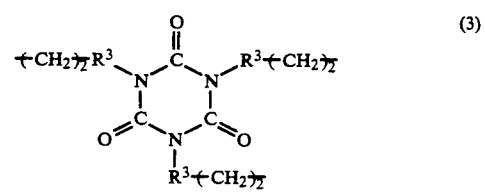

(3)

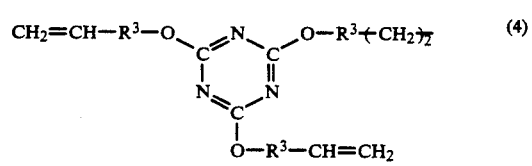

(4)

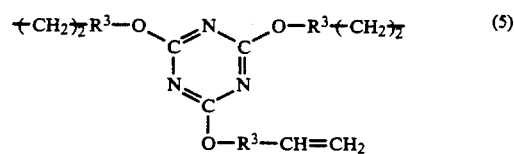

(5)

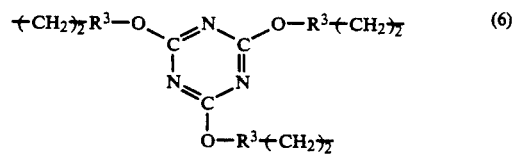

(6)

wherein $R^3$ is a —CH$_2$— group,

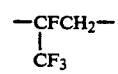

group or —(CF$_2$)$_5$—OCH$_2$— group, and mixtures thereof.

Preferably, the modified silicone vulcanization activator is an organopolysiloxane containing at least two allylisocyanurate or allylcanurate groups per molecule, the organopolysiloxane having the formula:

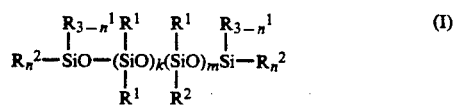

(I)

wherein $R^1$ is selected from the class consisting of a hydrogen atom and a substituted or unsubstituted monovalent hydrocarbon group having 1 to 21 carbon atoms.

$R^2$ is a nitrogenous organic group represented by formula (1) or (4):

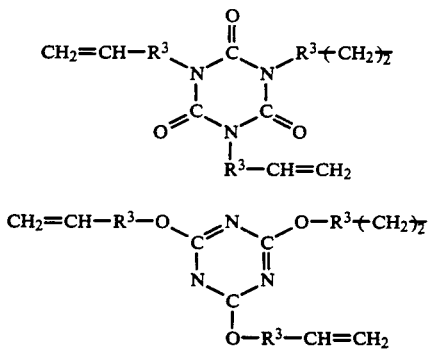

wherein $R^3$ is a —CH$_2$— group,

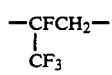

group or —(CF$_2$)$_5$—OCH$_2$—group, and letter k is an integer of from 0 to 50, m is an integer of from 0 to 50, and n is equal to 0, 1 or 2.

The present invention also encompasses a process for preparing the modified silicone vulcanization activator defined above. In one form of the invention, the process includes the steps of: reacting triallyl isocyanurate, triallyl cyanurate or a derivative thereof with dimethyl chlorosilane or methyldichlorosilane in the presence of a platinum catalyst, and hydrolyzing the resulting chlorosilane containing diallylisocyanurate or diallylcyanurate groups.

The process may further include the step of: reacting the siloxane resulting from hydrolysis of the chlorosilane containing diallylisocyanurate or diallylcyanurate groups with a siloxane having a backbone comprising R$^1$$_2$SiO units wherein R$^1$ is selected from the class consisting of a hydrogen atom and a substituted or unsubstituted monovalent hydrocarbon group having 1 to 12 carbon atoms, in the presence of a basic catalyst, thereby effecting reequilibration.

In another form of the invention, the process includes the step of: reacting triallyl isocyanurate, triallyl cyanurate or a derivative thereof with a siloxane of the formula

wherein $R^1$ is selected from the class consisting of a hydrogen atom and a substituted or unsubstituted monovalent hydrocarbon group having 1 to 12 carbon atoms, at least two $R^1$ substituents in formula (II) being hydrogen atoms, and letter k is an integer of from 0 to 50, in the presence of a platinum catalyst.

More particularly, when the siloxane as defined above is blended as a vulcanization activator in a peroxide vulcanizable fluorocarbon rubber composition along with a peroxide vulcanizing agent, the rubber composition can be satisfactorily vulcanized by the HAV method. This vulcanization activator also permits satisfactory vulcanization of a rubber composition containing both fluorocarbon rubber and silicone rubber components. There can be produced fluorocarbon rubber and similar rubber articles having improved rubbery properties, especially low-temperature properties. The rubber composition having this vulcanization activator compounded therein is improved in processability so that a continuous length of the composition may be shaped and vulcanized utilizing an extrusion or calender roll process. Therefore the siloxane of the invention is an effective vulcanization activator or aid for assisting in vulcanization of rubber compositions with peroxide vulcanizing agents.

BRIEF DESCRIPTION OF THE DRAWINGS

FIG. 5 is a graph showing vulcanization curves of rubber compositions containing the present activator and a prior art triallyl isocyanurate activator.

DETAILED DESCRIPTION OF THE INVENTION

Figure 1:
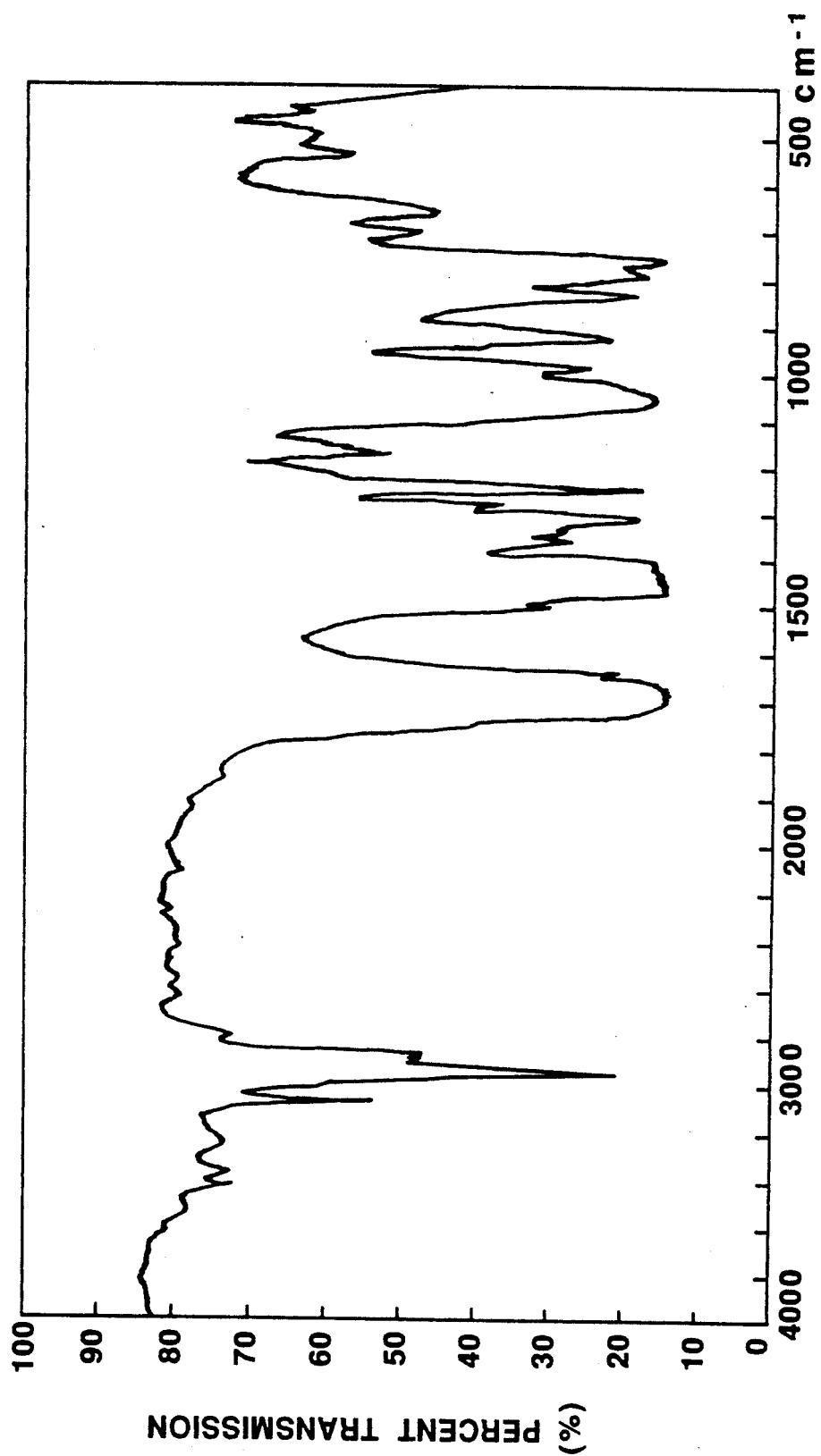
FIGS. 1 to 4 are IR spectra of siloxanes of Examples 5, 6, 7, and 10, respectively.

The modified silicone vulcanization activator of the invention is in the form of an organopolysiloxane comprising units selected from [R$^1$$_2$SiO$_{2/2}$] units and [R$^1$$_3$SiO$_{1/2}$] units wherein R$^1$ is selected from the class consisting of a hydrogen atom and a substituted or unsubstituted monovalent hydrocarbon group having 1 to 12 carbon atoms. At least two, preferably 2 to 10 of the R$^1$ substituents per molecule are replaced by isocyanurate or cyanurate groups selected from the class consisting of nitrogenous organic groups represented by formulae (1) to (6):

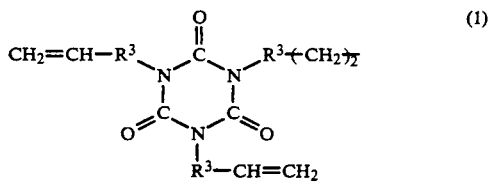

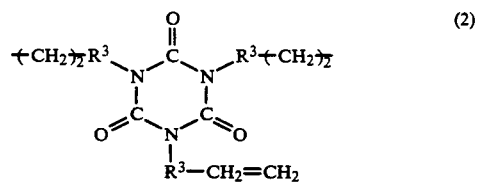

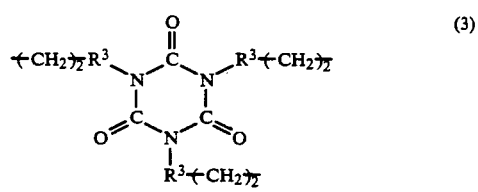

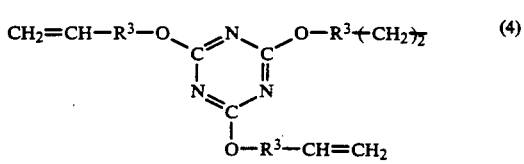

-continued

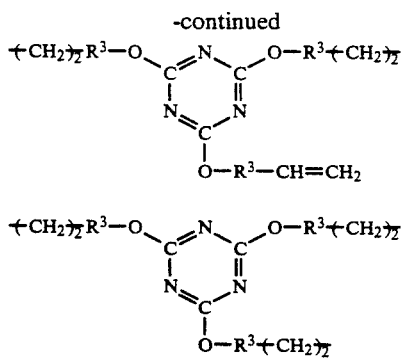

wherein R³ is a —CH₂— group,

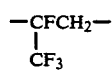

group or $(CF_2)_5 OCH_2$—group, and mixtures thereof.

In the $[R^1{}_2SiO_{2/2}]$ and $[R^1{}_3SiO_{1/8}]$ units, $R^1$ is a hydrogen atom or a substituted or unsubstituted monovalent hydrocarbon group having 1 to 21 carbon atoms, preferably 1 to 12 carbon atoms. Illustrative examples of $R^1$ include a hydrogen atom, an alkyl group such as a methyl, ethyl, propyl, butyl, and cyclohexyl group, an alkenyl group such as a vinyl and allyl group, an aryl group such as a phenyl and tolyl group, and substituted ones of these groups in which some of the hydrogen atoms attached to a carbon atom are replaced by halogen atoms or cyano groups, such as a chloromethyl, 3-chloropropyl, $—CH_2CH_2CaF_{2a+1}$ wherein a is equal to 1 to 10, $$—(CH_2)_3OCH_2CF(OCF_2CF)_bF$$
$$\phantom{—(CH_2)_3OCH_2C}|\phantom{F(OCF_2C}|$$
$$\phantom{—(CH_2)_3OCH_2C}CF_3\phantom{F(OC}CF_3$$

wherein b is equal to 1 to 5, and 2-cyanoethyl group.

In each molecule of the siloxane constituting the vulcanization activator of the invention, at least two, preferably 2 to 10 of the $R^1$ substituents in the $[R^1{}_2SiO_{2/2}]$ and $[R^1{}_3SiO_{1/8}]$ units are replaced by isocyanurate or cyanurate groups selected from the nitrogenous organic groups of formulae (1) to (6). Preferred nitrogenous organic groups are those containing two alkenyl groups.

Therefore, the preferred modified silicone vulcanization activator is an organopolysiloxane of the formula:

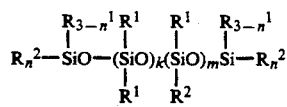

containing at least two allylisocyanurate or allylcyanurate groups per molecule.

In formula (I), $R^1$ is selected from the class consisting of a hydrogen atom and a substituted or unsubstituted monovalent hydrocarbon group having 1 to 21 carbon atoms, preferably 1 to 12 carbon atoms, $R^2$ is a nitrogenous organic group of formula (1) or (4):

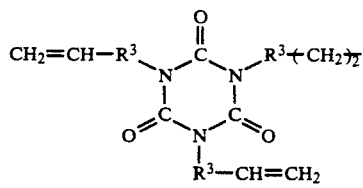

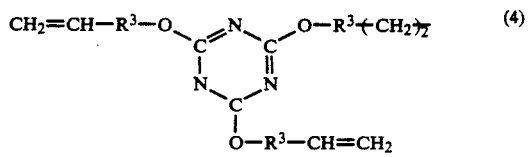

wherein R³ is a —CH₂— group,

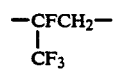

group or $—(CF_2)_5—OCH_2—$ group, and letter k is an integer of from 0 to 50, m is an integer of from 0 to 50, and n is equal to 0 or 1.

For better vulcanization effect, the siloxane of formula (I) should preferably contain at least two, preferably two to ten allylisocyanurate and allylcyanurate groups per molecule which participate in reaction with the peroxide vulcanizing agent.

In order that the siloxane of formula (I) act as a vulcanization activator for a rubber without detracting from the properties of the rubber, the length of the siloxane is limited to 2 to 100 units, preferably 2 to 10 units. Accordingly, letters k and m are both integers of from 0 to 50.

The siloxane of the invention can be synthesized according to the following processes by introducing diallylisocyanurate or diallylcyanurate groups into a starting siloxane.

A first process is by reacting triallyl isocyanurate, triallyl cyanurate or a derivative thereof with dimethylchlorosilane or methyldichlorosilane in the presence of a platinum group catalyst to form a chlorosilane containing diallylisocyanurate or diallylcyanurate groups, and hydrolyzing the chlorosilane. The derivatives of triallyl isocyanurate and triallyl cyanurate include, for example, tri1-trifluoromethyl-1-fluoro-3-butenyl-)isocyanurate and tri[5 (2-propenoxy) 1,1,2,2,3,3,4,4,5,5.decafluoropentyl)]isocyanurate. Preferably, triallyl isocyanurate, triallyl cyanurate or a derivative thereof is reacted with dimethylchlorosilane or methyldichlorosilane in a molar ratio of from 0.5:1 to 2:1, more preferably from 0.8:1 to 1.2:1.

The platinum group catalysts for addition reaction may be any desired catalyst capable of promoting the addition reaction between an aliphatic unsaturated group and a hydrosilyl group, for example, platinum black, solid platinum on suitable supports such as alumina and silica, chloroplatinic acid, alcohol-modified chloroplatinic acid, coordination compounds of chloroplatinic acid with olefins, vinylsiloxanes or acetylene compounds, tetrakis(triphenylphosphine)palladium, and chlorotris(triphenylphosphine)rhodium, with the platinum catalysts being preferred. Most often, the platinum group catalyst is a commonly used platinum catalyst, typically chloroplatinic acid. The amount of platinum catalyst added is preferably in the range of from 1 ppm to 1% by weight, more preferably from 0.01% to 1% by weight based on the total weight of the reactants.

The reaction is effected preferably in an organic solvent, typically an aromatic solvent such as toluene, benzene, and xylene, under varying conditions, typically at a temperature of 40 to 110° C. for about 1 to 7 hours.

The reaction results in a chlorosilane containing diallylisocyanurate or diallylcyanurate groups. The chlorosilane is then hydrolyzed in a conventional manner, for example, by stirring in an aqueous solution of a weak base such as sodium hydrogen carbonate at about 5° C. to about 35° C., typically at room temperature for about 1 to about 7 hours, thus resulting in the desired siloxane or vulcanization activator according to the invention. The weak base is used in an effective amount to neutralize HCl resulting from hydrolysis.

A second process is by reacting the siloxane resulting from hydrolysis of the chlorosilane containing diallylisocyanurate or diallylcyanurate groups with a siloxane having a backbone comprising $R^1_2SiO$ units in the presence of a basic catalyst, thereby effecting re-equilibration.

In the $R^1_2SiO$ units, $R^1$ is a hydrogen atom or a substituted or unsubstituted monovalent hydrocarbon group having 1 to 21 carbon atoms, preferably 1 to 12 carbon atoms, for example, an alkyl group such as a methyl, ethyl, propyl, butyl, and cyclohexyl group, an alkenyl group such as a vinyl and allyl group, and an aryl group such as a phenyl and tolyl group, and substituted ones of these groups in which some or all of the hydrogen atoms are replaced by halogen atoms such as fluorine atoms, for example, $-CH_2CH_2C_aF_{2a+1}$ wherein a is 1 to 10, $-(CH_2)_3OCH_2CFCF_3(OCF_2CF(CF_3))_bF$ wherein b is 1 to 5, such as $-CF_3$, $-CH_2CH_2CF_3$, $-CH_2CH_2C_8F_{17}$, and

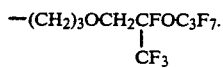

Typical examples of the siloxane having a backbone comprising $R^1_2SiO$ units are chain and cyclic diorganosiloxanes of the following formulae.

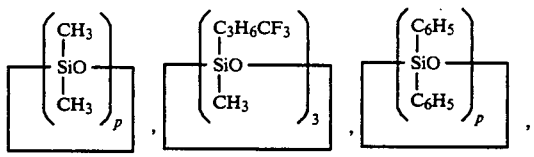

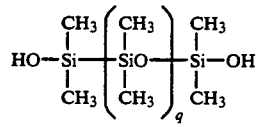

wherein p is an integer of from 3 to 6, and q is an integer of 0 to 10.

The reaction is preferably conducted by mixing the siloxane resulting from hydrolysis of the chlorosilane and the siloxane based on $R^1_2SiO$ units in a molar ratio of from 0.5:1 to 2:1, preferably 0.8:1 to 1.2:1 and adding a basic catalyst such as potassium hydroxide., lithium hydroxide-and sodium hydroxide containing siliconate in an amount of 0.01 to 1% by weight based on the total weight of the siloxane reactants. It is desirable to effect the reaction in nitrogen gas at a temperature of 40 to 110° C. for about 1 to 7 hours. At the end of reaction, the reaction product, that is, the siloxane of formula (I) is collected in a conventional manner.

A third process is by reacting triallyl isocyanurate, triallyl cyanurate or a derivative thereof with a siloxane of the formula:

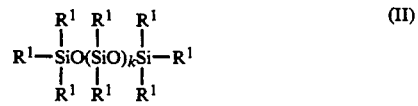

in the presence of a platinum catalyst.

In formula (II), $R^1$ is as defined above, at least two, preferably two to ten of the $R^1$ substituents are hydrogen atoms, and letter k is an integer of from 0 to 50, The siloxane of formula (II) is preferably terminated with Si—H groups. However, Si—H groups may be present on a side chain of the siloxane insofar as the siloxane does not gel upon reaction with triallyl isocyanurate or a similar compound and an excess of triallyl isocyanurate or a similar compound does not adversely affect the effectiveness of the resulting siloxane of formula (I) as a vulcanization activator. The number of Si—H groups is not particularly limited as long as it is two or more. In this sense, hydrogensiloxanes having Si-.H groups incorporated as a trifunctional unit at the molecular chain end are included.

Examples of the siloxane of formula (II) include
1,1,3,3-tetramethyldisiloxane,
1,1,3,3,5,5,7,7-octamethyltetrasiloxane,
1,1,3,5,5-pentamethyl-3 -(3,3,4,4,5,5,6,6,7,7,8,8,9,9, 10,10,10-heptadecafluoro)decyltrisiloxane,
1,1,3,5,5-pentamethyl-3-phenyltrisiloxane. and
1,1,3,5,5-pentamethyl 3-(2-heptadeoaootyl)ethyl-1,3,5-trisiloxane.

The triallyl isocyanurate or similar compound is preferably mixed with the siloxane of formula (II) in a molar ratio of 0.5:1 to 2:1, especially from 0.8:1 to 1.2:1.

Most often, the platinum catalyst is a commonly used platinum catalyst, typically chloroplatinic acid. The amount of platinum catalyst added is preferably in the range of from 0.01 to 1% by weight based on the total weight of the reactants, that is, triallyl isocyanurate or similar compound plus siloxane of formula (II).

The reaction is effected preferably in an organic solvent such as an aromatic solvent (e.g., benzene, toluene, and xylene) under varying conditions, typically at a temperature of 40 to 110° C. for about 1 to 7 hours.

The siloxanes obtained by either of the first to third processes are modified silicone vulcanization activators which can be used in vulcanization of rubber along with peroxide vulcanizing agents without detracting from the properties of the rubber. As a result, there is obtained a rubber composition having improved vulcanizing behavior and processability. For vulcanization of the composition, hot air vulcanization (HAV) is applicable. For example, the composition can be vulcanized simply by heating in air at 150 to 200° C. for about 10 to 30 minutes.

The rubber compositions to which the vulcanization activator of the invention is applicable include compositions comprised of a fluororubber (e.g., HFP/VdF, TFE/HFP/VdF, and HFP/PAVE copolymers), an organic peroxide, and an inorganic filler (e.g., carbon black) and compositions comprised of a fluororubber (e.g., HFP/VdF, TFE/HFP/VdF, and HFP/PAVE copolymers), a silicone rubber (or fluorosilicone rubber), an organic peroxide, and an inorganic filler (e.g., carbon black). The fluororubbers used herein include homopolymers of vinylidene fluoride and ethylene tetrafluoride; copolymers of propylene hexafluoride with at least one monomer of vinylidene fluoride and ethylene tetrafluoride; and copolymers of at least one monomer of vinylidene fluoride, ethylene tetrafluoride, and propylene hexafluoride with a copolymerizable monomer. The monomers which are copolymerizable with vinylidene fluoride include olefins having an ether bond on a side chain such as trifluoroethylene trifluoromethyl ether; olefins such as ethylene, propylene, and isobutylene; haloolefins such as trifluoroethylene and monochlorotrifluoroethylene; olefins having a fluoroalkyl group such as perfluorobutylethylene ($C_4F_9CH=CH_2$), perfluorohexaethylene ($C_6F_{13}CH=CH_2$), and perfluorooctaethylene ($C_8F_{17}CH=CH_2$); haloethers such as perfluoroperfluorovinyl ether and alkyl fluorovinyl ether; and ethers such as ethyl vinyl ether. These fluororubbers are commercially available as VITON A type, B type and G type from E.I duPont, Fluorel FC-2145, FC2230, FC-2260, and FLS-2690 from 3M, Daiel G-201, G-501, G-801, G-901, G-902, G-912, and G-1001 from Daikin Industry K.K., and Aflus 200 series, 150 series, and 100 series from Asahi Glass K.K. The organic peroxides used herein include benzoyl peroxide and other organic peroxides having a monovalent substituted- or unsubstituted alkyl group at each end such as 2,5-dimethyl-2,5-bis(t-butylperoxy)hexane. The inorganic fillers used herein include carbon black such as SRF and MT; metal oxides such as magnesium oxide and lead oxide; metal hydroxides such as calcium hydroxide; epoxy compounds; organic tin compounds; and alkaline earth metal salts. In addition, there may be contained deoxidizers; fillers such as silica, clay, diatomaceous earth, and talc; plasticizers such as relatively low-molecular weight fluororubbers and fluoro-modified silicone fluid; processing aids such as carnauba wax; lubricants such as fatty acids and fatty acid metal salts (e.g., stearic acid and potassium stearate); and any other additives which are commonly added to the fluororubbers. The silicone rubbers used herein include any desired silicone rubber compositions based on silicone rubbers having dimethylsiloxane as the backbone and silicone rubbers having a methyl, phenyl or gamma-trifluoropropyl group as a side chain. Those silicone rubbers having a higher fluorine content are preferred for compatibility with the fluororubber. They are commercially available as KE and FE series from Shin-Etsu Silicone Co., Ltd., SH and SRXLS series from Toray Silicone K.K., TSE, YETHE, and FQE series from Toshiba Silicone K.K., and Silastic, TR, WE, HS, and LS series from Dow Corning.

When the modified silicone vulcanization activator of the invention is blended in a peroxide vulcanizable fluorocarbon rubber composition along with a peroxide vulcanizing agent, the rubber composition can be effectively vulcanized by the HAV method and efficiently processed by means of an extruder, calender roll or roll mill without a trouble into a rubber article of quality. In addition, the vulcanization activator of the invention can assist in vulcanization of a rubber composition comprising fluorocarbon rubber and silicone rubber components, typically 100 parts by weight of fluorocarbon rubber and up to 50 parts by weight of silicone rubber, which cures into a rubber article having improved rubber properties, especially low-temperature properties at a low cost.

EXAMPLE

Examples of the invention are given below by way of illustration and not by way of limitation. All parts and percents are by weight unless otherwise stated.

EXAMPLE 1

Step (1)

To a mixture of 49.8 grams (0.2 mcl) of triallyl isocyanurate and 60 grams of toluene was added 5 ml of toluene containing 0.007 grams of chloroplatinic acid. The mixture was heated to 100° C. Then 18.9 grams (0.2 mol) of dimethylchlorosilane was added dropwise to the mixture at a temperature of 90 to 110° C. Stirring at 110° C. for a further 6 hours resulted in a 1:1 triallyl isocyanurate and silane adduct. The adduct was subjected to distillation, resulting in 19 grams (yield 28%) of a fraction at 169–175C./4 mmHg. NMR and IR spectroscopy identified this fraction to be 1-[3-(chlorodimethylsilyl)]propyl-3,5-diallylisocyanurate of the following formula.

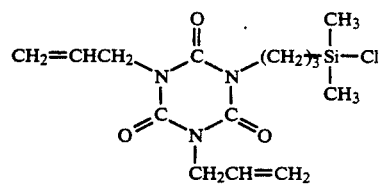

Step (2)

A solution of 19.0 grams (0.55 mol) of 1-[3-(chlorodimethylsilyl)]propyl-3,5-diallylisocyanurate synthesized in step (1) in 50 grams of toluene was added dropwise to a solution of 9.74 grams (0.116 mcl) of sodium hydrogen carbonate in 250 ml of water with vigorous stirring. Stirring was continued for 3 hours at room temperature. The organic layer was washed with water, dried with magnesium sulfate anhydride, and stripped of the toluene solvent at 60° C./4 mmHg. There was obtained 17.0 grams (0.0268 mol, yield 98%) of an oily compound which was a vulcanization activator according to the invention. IR spectroscopy identified this compound to be 1,1,3,3-tetramethyl-1,3-bis(-diallylisocyanurate propyl)disiloxane of the following structure (i).

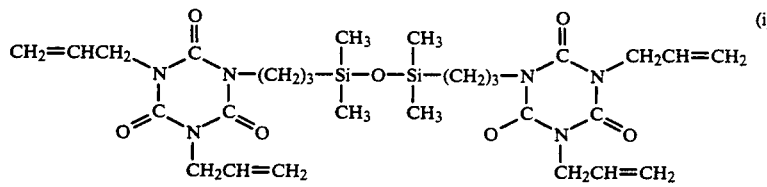 (i)

EXAMPLE 2

Step (1)

To a mixture of 49.8 grams (0.2 mol) of triallyl isocyanurate and 60 grams of toluene was added 5 ml of toluene containing 0.007 grams of chloroplatinic acid. Then 23.0 grams (0.2 mol) of methyldichlorosilane was added dropwise to the mixture at a temperature of 90 to 110° C. Stirring was continued at 110° C. for a further 6 hours. By distilling the reaction mixture, 14.5 grams (yield 20%) of a 1:1 triallyl isocyanurate and silane adduct was isolated as a fraction at 160° C/3 mmHg. NMR and IR spectroscopy identified this fraction to be 1-[3-(dichloromethylsilyl)]propyl-3,5-diallylisocyanurate of the following formula.

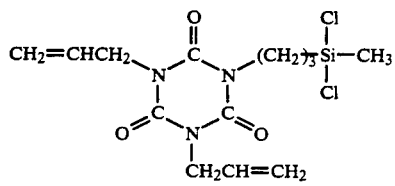

Step (2)

A solution of 14.5 grams of 1-[3-(dichloromethylsilyl)]propyl-3,5-diallylisocyanurate synthesized in step (1) in 50 grams of toluene was added dropwise to a solution of 7.1 grams (0.085 mol) of sodium hydrogen carbonate in 200 ml of water with stirring. Stirring was continued for 3 hours at room temperature. The organic layer was separated, washed with water, dried with magnesium sulfate anhydride, and stripped of the toluene. There was obtained 11.7 grams (yield 95%) of a viscous oil which was a vulcanization activator according to the invention. This oil was identified to be a polysiloxane having diallylisocyanurate propyl groups of the following structure (ii).

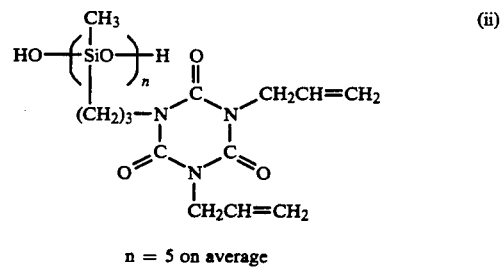

n = 5 on average

EXAMPLE 3

A flask was charged with 37 grams (Si unit 0.5 mol) of octamethylcyclotetrasiloxane and 38.3 grams (Si unit 0.2 mol) of 1,1,3,3-tetramethyl-1,3-bis(diallylisocyanurate propyl)disiloxane of structure (i) synthesized in Example 1. The contents were agitated for one hour at 120° C. in a nitrogen gas stream. Then 0.7 grams of a siliconate containing 10% of potassium hydroxide was added to the mixture, which was heated to 150° C. and reacted for a further 6 hours. At the end of reaction, the reaction mixture was diluted with 150 ml of toluene, washed with water to remove the potassium hydroxide, and stripped of the toluene and low-boiling fractions under vacuum (at 150° C./4 mmHg), thus obtaining 62 grams of a clear, pale yellow, oily compound which was a vulcanization activator according to the invention. IR spectroscopy identified this compound to be a siloxane having diallylisocyanurate groups of the following structure:

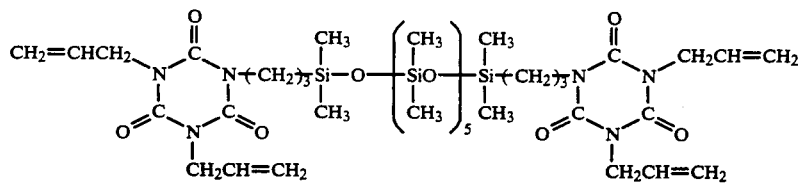

EXAMPLE 4

A flask was charged with 14.8 grams (Si unit 0.2 mol) of octamethylcyclotetrasiloxane, 7.7 grams (Si unit 0.04 mol) of the disiloxane of structure (i) synthesized in Example 1, and 30.9 grams (Si unit 0.1 mol) of the polysiloxane of structure (ii) synthesized in Example 2. Using 0.6 grams of a siliconate containing 10% of potassium hydroxide, reaction was carried out by the same procedure as in Example 3. There was obtained 52 grams of a clear, pale yellow, oily compound which was a vulcanization activator according to the invention. IR spectroscopy identified this compound to be a siloxane having diallylisocyanurate groups of the following structure:

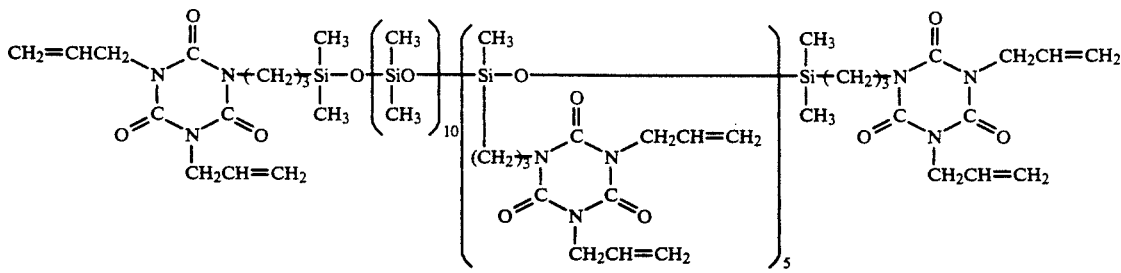

EXAMPLE 5

To a solution of 99 grams (0.4 mol) of triallyl isocyanurate in 100 ml of toluene was added 5 ml of toluene containing 0.007 grams of chloroplatinic acid. After the mixture was heated to 100 to 110° C, 26.8 grams (0.2 mol) of 1,1,3,3.tetramethyldisiloxane was added dropwise over 1 to 1.5 hours. Stirring was continued at 120 to 130° C. for a further 12 hours. The reaction mixture was heated to 200° C. while toluene was distilled off. The remaining toluene and low-boiling fractions were distilled off at 150° C./4 mmHg, obtaining 120 grams of a clear, yellow, viscous oily compound which was a vulcanization activator according to the invention.

FIG. 1 is an infrared absorption spectrum of this compound. In the spectrum, absorption peaks are found at 1700 cm$^{-1}$ (>C=O), 3190 cm$^{-1}$, and 1650 cm$^{-1}$ (—CH$_2$CH=CH$_2$), but the absorption peak near 2200 cm$^{-1}$ (Si—H) has disappeared.

EXAMPLE 6

The procedure of Example 5 was repeated except that 224 grams (0.9 mol) of triallyl isocyanurate and 40.2 grams (0.3 mol) of 1,1,3,3.tetramethyldisiloxane were used. There was obtained 256.2 grams of a siloxane containing allylisocyanurate groups which was a vulcanization activator according to the invention.

Figure 2:
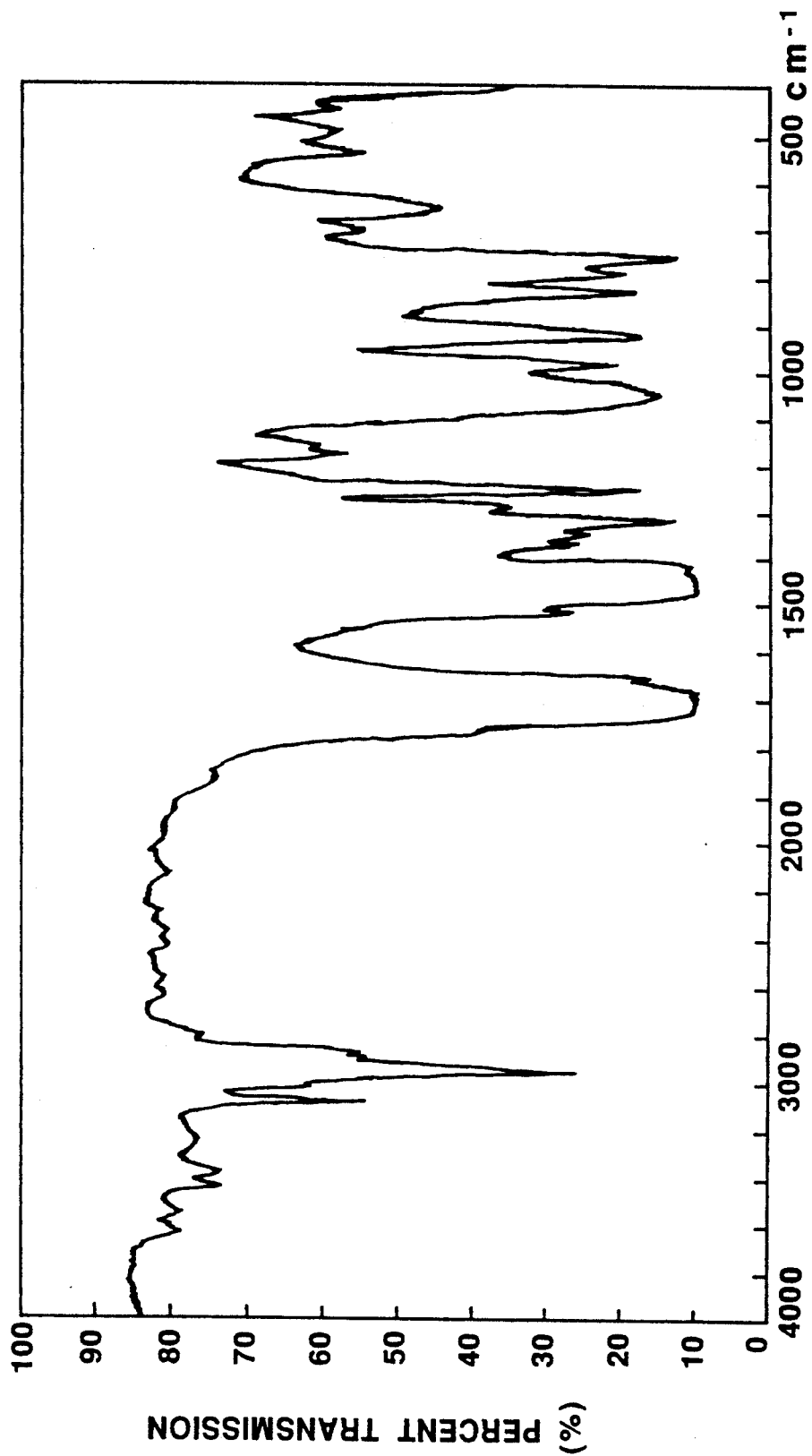

FIG. 2 is an infrared absorption spectrum of this compound. In the spectrum, absorption peaks are found at 1700 cm$^{-1}$ (>C=O), 3190 cm$^{-1}$, and 1650 cm$^{-1}$ (—CH$_2$CH=CH$_2$), but the absorption peak near 2200 cm$^{-1}$ (Si—H) has disappeared.

EXAMPLE 7

The procedure of Example 5 was repeated except that 199 grams (0.8 mol) of triallyl isocyanurate and 26.8 grams (0.2 mol) of 1,1,3,3 tetramethyldisiloxane were used. There was obtained 220 grams of a siloxane containing allylisocyanurate cyanurate groups which was a vulcanization activator according to the invention.

Figure 3:
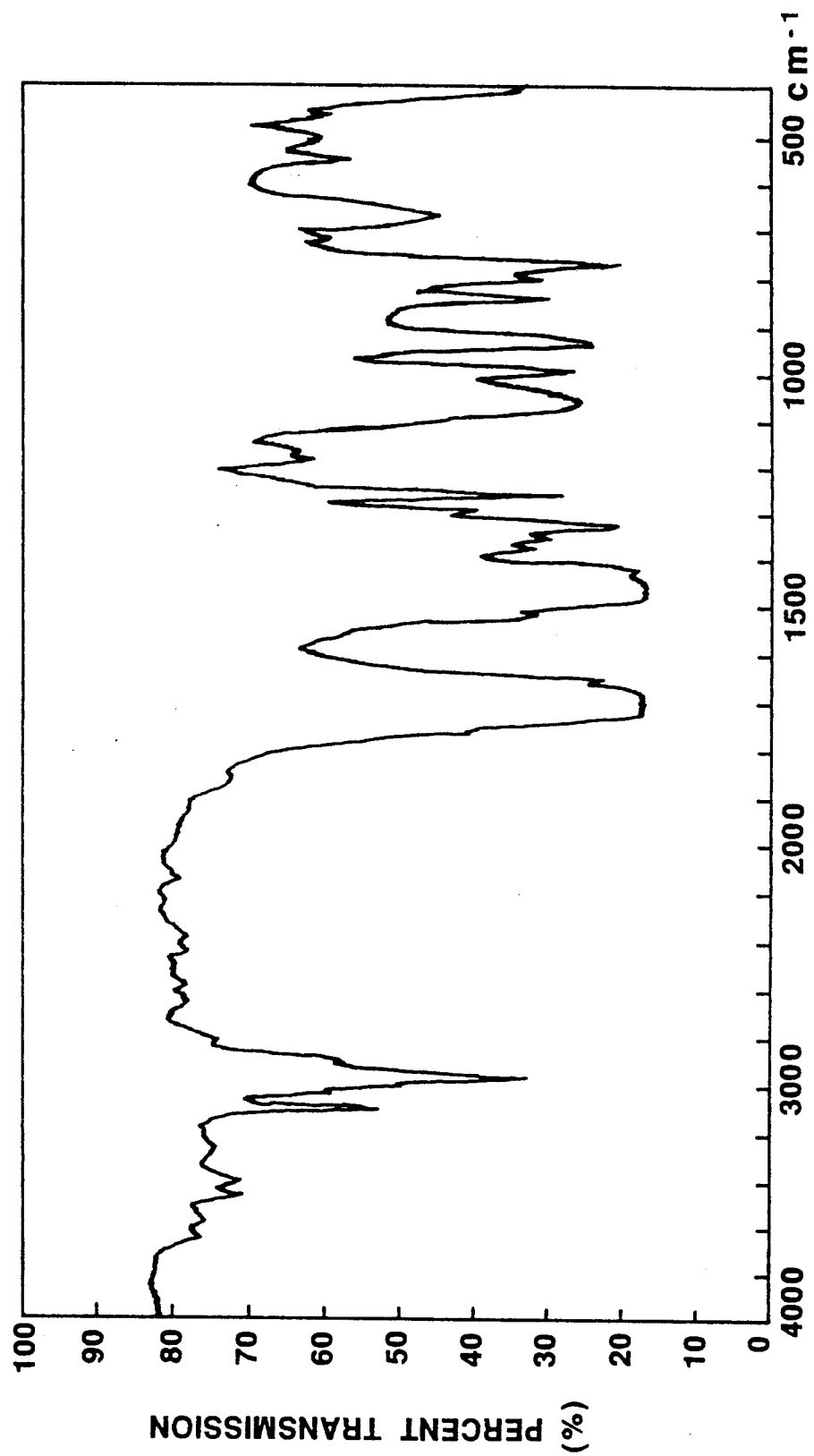

FIG. 3 is an infrared absorption spectrum of this compound. In the spectrum, absorption peaks are found at 1700 cm$^{-1}$ (>C=O), 3190 cm$^{-1}$, and 1650 cm$^{-1}$ (—CH$_2$CH=CH$_2$), but the absorption peak near 2200 cm$^{-1}$ (Si—H) has disappeared.

EXAMPLE 8

The procedure of Example 5 was repeated except that 112 grams (0.45 mol) of triallyl isocyanurate and 20.1 grams (0.15 mol) of 1,1,3,3 tetramethyldisiloxane were used. There was obtained 128 grams of a siloxane containing allylisocyanurate groups which was a vulcanization activator according to the invention.

An infrared absorption spectrum of this compound shows absorption peaks at 3200 cm$^{-1}$ and 1650 cm$^{-1}$ (—CH$_2$CH=CH$_2$), but no absorption peak at 2200 cm$^{-1}$ (Si—H).

EXAMPLE 9

The procedure of Example 5 was repeated except that 149 grams (0.6 mcl) of triallyl isocyanurate and 56.4 grams (0.2 mol) of 1,1,3,3,5,5,7,7 octanethyltetrasiloxane were used. There was obtained 195 grams of a siloxane containing allylisocyanurate groups which was a vulcanization activator according to the invention.

In an infrared absorption spectrum of this compound, absorption peaks are found at 1700 cm$^{-1}$ (>C=O), 3190 cm$^{-1}$, and 1650 cm$^{-1}$ (—CH$_2$CH=CH$_2$), but the absorption peak near 2200 cm$^{-1}$ (Si—H) has disappeared.

EXAMPLE 10

The procedure of Example 5 was repeated except that 149 grams (0.6 mol) of triallylisocyanurate and 128 grams (0.2 mol) of 1,1,3,5,5-pentamethyl-3-(3,3,4,4,5,5,6,6,7,7,8,8, 9,9,10,10,10-heptadecafluorodecyl) 1,3,5-trisiloxane of the formula:

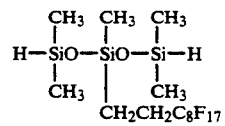

were used. There was obtained 263 grams of a siloxane containing allylisocyanurate groups which was a vulcanization activator according to the invention.

Figure 4:
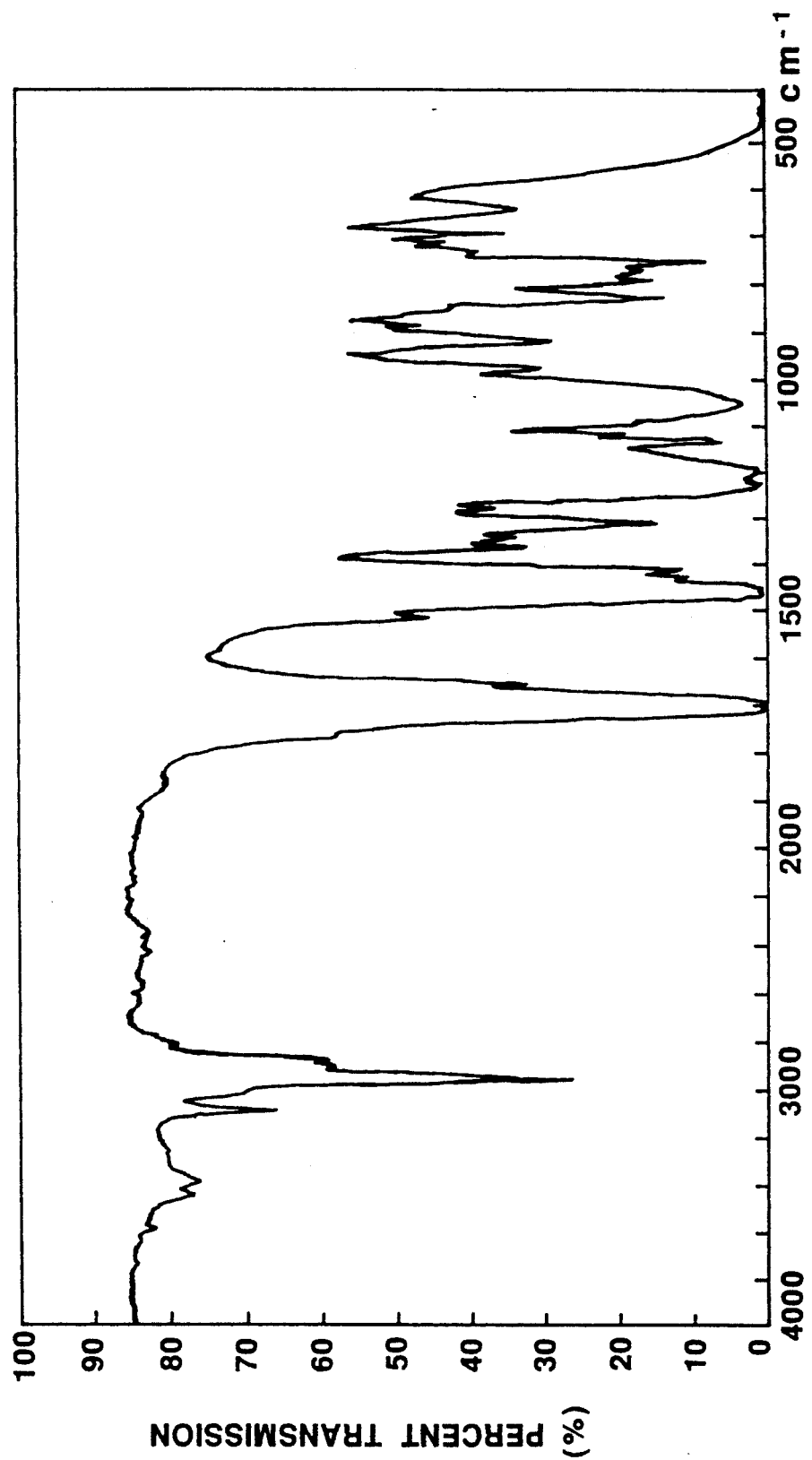

FIG. 4 is an infrared absorption spectrum of this compound. In the spectrum, absorption peaks are found at 1700 cm$^{-1}$ (>C=O), 3200 cm$^{-1}$, and 1650 cm$^{-1}$ (—CH$_2$CH=CH$_2$), but the absorption peak near 2200 cm$^{-1}$ (Si—H) has disappeared.

EXAMPLE 11

The procedure of Example 5 was repeated except that 149 grams (0.6 mcl) of triallyl isocyanurate and 54 grams (0.2 mol) of 1,1,3,5,5 pentamethyl 3-phenyl-1,3,5-trisiloxane were used. There was obtained 195 grams of a siloxane containing allylisocyanurate groups which was a vulcanization activator according to the invention.

In an infrared absorption spectrum of this compound, absorption peaks are found at 1700 cm$^{-1}$ (>C=O), 3200 cm$^{-1}$, and 1650 cm$^{-1}$ (—CH$_2$CH=CH$_2$), but the absorption peak near 2200 cm$^{-1}$ (Si—H) has disappeared.

EXAMPLE 12

The procedure of Example 5 was repeated except that 50 grams (0.2 mol) of triallyl isocyanurate and 64 grams (0.1 mol) of 1,1,3,5,5 pentamethyl-3-(heptadecafluorodecyl)1,3,5-trisiloxane were used. There was obtained 111 grams of a siloxane containing allylisocyanurate groups which was a vulcanization activator according to the invention.

EXAMPLE 13

The procedure of Example 5 was repeated except that 110 grams (0.2 mol) of tris-(1-trifluoromethyl -1-fluoro-3-butenyl) isocyanurate and 64 grams (0.1 mol) of 1,1,3,5,5 -pentamethyl-3-(heptadecafluorodecyl)1,3,5-trisiloxane were used. There was obtained 165 grams of a isocyanurate-modified siloxane which was a vulcanization activator according to the invention.

EXAMPLE 14

The procedure of Example 5 was repeated except that 209 grams (0.2 mol) of tris-[5-(2-propenoxy) 1,1,2,2,3,3,4,4, 5,5,-decafluoropentyl]isocyanurate and 64 grams (0.22 mol) of 1,1,3,5,5 pentamethyl-3 (heptadecafluorodecyl)-1,3,5-trisiloxane were used. There was obtained 252 grams of a isocyanurate-modified siloxane which was a vulcanization activator according to the invention.

In infrared absorption spectra of the compounds of Examples 12-14, absorption peaks are found at 1700 cm$^{-1}$ ($>$C=O), 3200 cm$^{-1}$, and 1150 cm$^{-1}$ (—CH$_2$CH=CH$_2$), but the absorption peak near 2200 cm$^{-1}$ (Si—H) has disappeared.

EXAMPLE 15

This example is to examine the effectiveness of a vulcanization activator of the invention. A fluorocarbon rubber was vulcanized using the siloxane containing allylisocyanurate groups obtained in Example 10.

A rubber compound was prepared by adding 20 parts by weight of MT carbon black (N.990, Can Carb Company), 1.5 parts by weight of 2,5-dimethyl-2,5 di(tert-butyl)peroxyhexane (Perhexa 2.5B, Nihon Oil & Fat K.K.), 5 parts by weight of Ca(OH)$_2$ (Caldic 2000, Ohmi Chemical Industry K.K.), and 15 parts by weight of the siloxane containing allylisocyanurate groups synthesized in Example 10 to 100 parts by weight of a fluorocarbon rubber (trade name G-801, Daikin Industry K.K.), and milling the mixture on a rubber roll mill. Vulcanization of the rubber compound was evaluated by means of Oscillating Rheometer (ASTM.100 model, Toyo Seiki K.K.) by measuring a variation in torque at 175° C.

For comparison purposes, a rubber compound was prepared as above except that 4 parts by weight of triallyl isocyanurate (TAIC) instead of the siloxane of Example 10 was added to 100 parts by weight of a fluorocarbon rubber (trade name G-801, Daikin Industry K.K.) This rubber compound was similarly evaluated for vulcanization.

The results are shown in FIG. 5 in which curve A corresponds to the rubber compound containing the siloxane of Example 10 and curve B corresponds to the comparative rubber compound containing TAIC. Curve A shows a little faster vulcanization rate than curve B.

EXAMPLE 16

Rubber compositions were prepared by roll milling the ingredients shown in Table 1 and then press vulcanized at 170° C. for 15 minutes, obtaining rubber sheets of 2 mm thick. The rubber sheets were further vulcanized in an oven at 200° C. for 24 hours.The sheets were evaluated for hardness, tensile strength (kg/cm$^2$), elongation (%), and tear strength (kg/cm) by the standard methods according to JIS K 6304. The results are also shown in Table 1.

TABLE 1

|  | Sample No. | | | | |
| --- | --- | --- | --- | --- | --- |
|  | 1 | 2 | 3 | 4 | 5 |
| Composition (part by weight) | | | | | |
| G-912 | 100 | 100 | 100 | 100 | 100 |
| FE-381 | — | — | — | 50 | 50 |
| TAIC | 4 | — | — | — | — |
| MT-Carbon | 20 | 11 | — | 11 | — |
| Aerogel 200 | — | — | 20 | — | 20 |
| Perhexa 2.5B | 3 | 3 | 3 | 3 | 3 |
| Caldic 2000 | — | 4 | 4 | 4 | 4 |
| SF-18 | — | 6 | 6 | 6 | 6 |
| Properties | | | | | |
| Hardness | 70 | 74 | 73 | 65 | 64 |
| Tensile S. | 183 | 189 | 162 | 195 | 170 |
| Elongation | 168 | 484 | 521 | 595 | 550 |
| Tear S. | 14 | 18 | 16 | 16 | 15 |

G-912: fluororubber by Daikin K.K.
FE-381: fluorosilicone rubber by Shin-Etsu Chemical Co.
TAIC: triallyl isocyanurate
MT-carbon: carbon black by Can Carb Co.
Aerogel 200: fumed silica by Nihon Aerogel K.K.
Perhexa 2.5B: 2,5-dimethyl-2,5-di(tert.-butyl)peroxyhexane by Nihon Oil & Fat K.K.
Caldic 2000: calcium hydroxide by Ohmi Chemical Industry
SF-18:

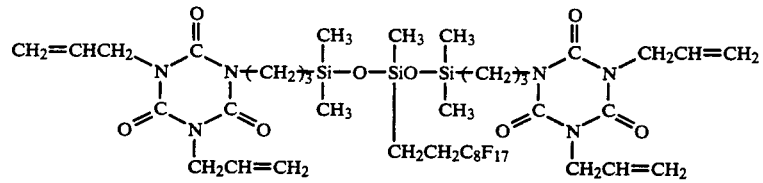

As seen from Table 1, the activator of the present invention allows the rubber composition to improve elongation while maintaining hardness, tensile strength, and tear strength unchanged. Therefore the activator of the invention, when used in vulcanizing compositions of a fluororubber alone or in admixture with a silicone rubber, can improve the elongation of the cured compositions as compared with the prior art method.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method of vulcanizing a rubber component with an organic peroxide in the presence of a vulcanization activator, wherein the rubber component contains a fluororubber, a mixture of a fluororubber and a silicone rubber, or a mixture of a fluororubber and a fluorosilicone rubber, the method comprising:

heating a mixture of the rubber component, the organic peroxide and the vulcanization activator in the presence of air to a temperature of 150° C. to 200° C. for about 10 to 30 minutes, wherein the vulcanization activator is an organopolysiloxane comprising units selected from [$R^1_2SiO_{2/2}$] or [$R^1_3SiO_1$] wherein $R^1$ is a hydrogen atom or a substituted or unsubstituted monovalent hydrocarbon group having 1 to 21 carbon atoms, and wherein at least two $R^1$ substituents per molecule are replaced by an isocyanurate or a cyanurate substituent selected from the group consisting of:

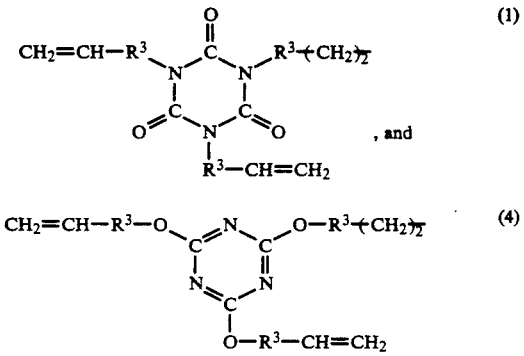

wherein $R^3$ is a —$CH_2$— group,

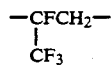

group, a —$(CF_2)_5$—$OCH_2$— group, or a mixture thereof.

2. The method of vulcanizing a rubber component as recited in claim 1, wherein:
the flurorubber is selected from the group consisting of:
a homopolymer of vinylidene fluoride, a homopolymer of ethylene tetrafluoride, copolymers of propylene hexafluoride with at least one monomer selected from the group consisting of vinylidene fluoride and ethylene tetrafluoride, and copolymers of at least one monomer selected from the group consisting of vinylidene fluoride, ethylene tetrafluoride, and propylene hexafluoride with a copolymerizable monomer.

3. The method of vulcanizing a rubber component as recited in claim 1, wherein:
the fluororubber is selected from the group consisting of:
homopolymer of vinylidene fluoride, a homopolymer of ethylene tetrafluoride, copolymers of propylene hexafluoride with at least one monomer selected from the group consisting of vinylidene fluoride and ethylene tetrafluoride, and copolymers of at least one monomer selected from the group consisting of vinylidene fluoride, ethylene tetrafluoride, and propylene hexafluoride with a copolymerizable monomer;

the silicone rubber possesses a dimethylsiloxane backbone which is optionally substituted with a methyl or a phenyl group; and
the fluorosilicone rubber possesses a dimethylsiloxane backbone.

4. The method of vulcanizing a rubber component as recited in claim 1, wherein:
the fluororubber is selected from the group consisting of:
a homopolymer of vinylidene fluoride, a homopolymer of ethylene tetrafluoride, copolymers of propylene hexafluoride with at least one monomer selected from the group consisting of vinylidene fluoride and ethylene tetrafluoride, and copolymers of at least one monomer selected from the group consisting of vinylidene fluoride, ethylene tetrafluoride, and propylene hexafluoride with a copolymerizable monomer;

the silicone rubber is selected from the group consisting of:
silicone rubbers possessing a dimethylsiloxane backbone, silicone rubbers possessing a dimethylsiloxane backbone having a methyl group as a substituent thereon, and silicone rubbers possessing a dimethylsiloxane backbone having a phenyl group as a substituent thereon; and
the fluorosilicone rubber possesses a dimethylsiloxane backbone having a gamma-trifluoropropyl group as a substituent thereon.

5. A method of vulcanizing a rubber component with an organic peroxide in the presence of a vulcanization activator, wherein the rubber component contains a fluororubber, a mixture of a fluororubber and a silicone rubber, or a mixture of a fluororubber and a fluorosilicone rubber, the method comprising:
heating a mixture of the rubber component, the organic peroxide and the vulcanization activator in the presence of air to a temperature of 150° C. to 200° C. for about 10 to 30 minutes,
wherein the vulcanization activator is an organopolysiloxane having the formula:

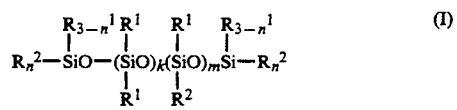

wherein $R^1$ is a hydrogen atom, or a substituted or unsubstituted monovalent hydrocarbon group having 1 to 21 carbon atoms,
$R^2$ is a nitrogenous organic group represented by formula (1) or (4):

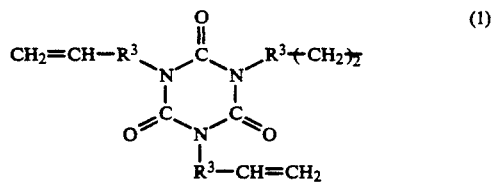

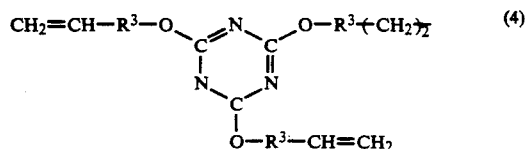

wherein $R^3$ is a —$CH_2$— group, a

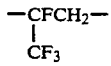

group or a —$(CF_2)_5$—$OCH_2$—group,
k is an integer of from 0 to 50,
m is an integer of 0 to 50,
n is equal to 1 or 2, and
wherein said Formula I organopolysiloxane contains at least two $R^2$ substituents.

6. The method of vulcanizing a rubber component as recited in claim 5, wherein:
the fluororubber is selected from the group consisting of:
a homopolymer of vinylidene fluoride, a homopolymer of ethylene tetrafluoride, copolymers of propylene hexafluoride with at least one monomer selected from the group consisting of vinylidene fluoride and, ethylene tetrafluoride, and propylene hexafluoride with a copolymerizable monomer.

7. The method of vulcanizing a rubber component as recited in claim 5, wherein:
the fluororubber is selected from the group consisting of:
a homopolymer of vinylidene fluoride, a homopolymer of ethylene tetrafluoride, copolymers of propylene hexafluoride with at least one monomer selected from the group consisting of vinylidene fluoride and ethylene tetrafluoride, and copolymers of at least one monomer of vinylidene fluoride, ethylene tetrafluoride, and propylene hexafluoride with a copolymerizable monomer;
the silicone rubber possesses a dimethylsiloxane backbone which is optionally substituted with a methyl or a phenyl group; and
the fluorosilicone rubber possesses a dimethylsiloxane backbone.

8. The method of vulcanizing a rubber component as recited in claim 5, wherein:
the fluororubber is selected from the group consisting of:
a homopolymer of vinylidene fluoride, a homopolymer of ethylene tetrafluoride, copolymers of propylene hexafluoride with at least one monomer selected from the group consisting of vinylidene fluoride and ethylene tetrafluoride, and copolymers of at least one monomer selected from the group consisting of vinylidene fluoride, ethylene tetrafluoride, and propylene hexafluoride with a copolymerizable monomer;
the silicone rubber is selected from the group consisting of:
silicone rubbers possessing a dimethylsiloxane backbone, silicone rubbers possessing a dimethylsiloxane backbone having a methyl group as a substituent thereon, and silicone rubbers possessing a dimethylsiloxane backgone having a phenyl group as a substituent thereon; and
the fluorosilicone rubber possesses a dimethylsiloxane backbone having a gamma-triflurorpropyl group as a substituent thereon.

* * * * *